May 3, 1927.
W. V. GILBERT
1,627,499
DETACHABLE WHEEL MECHANISM
Filed June 7, 1926
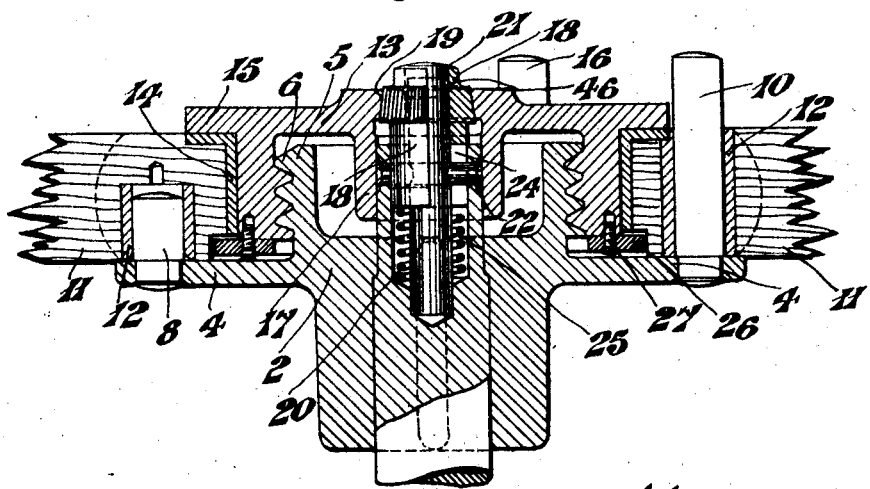
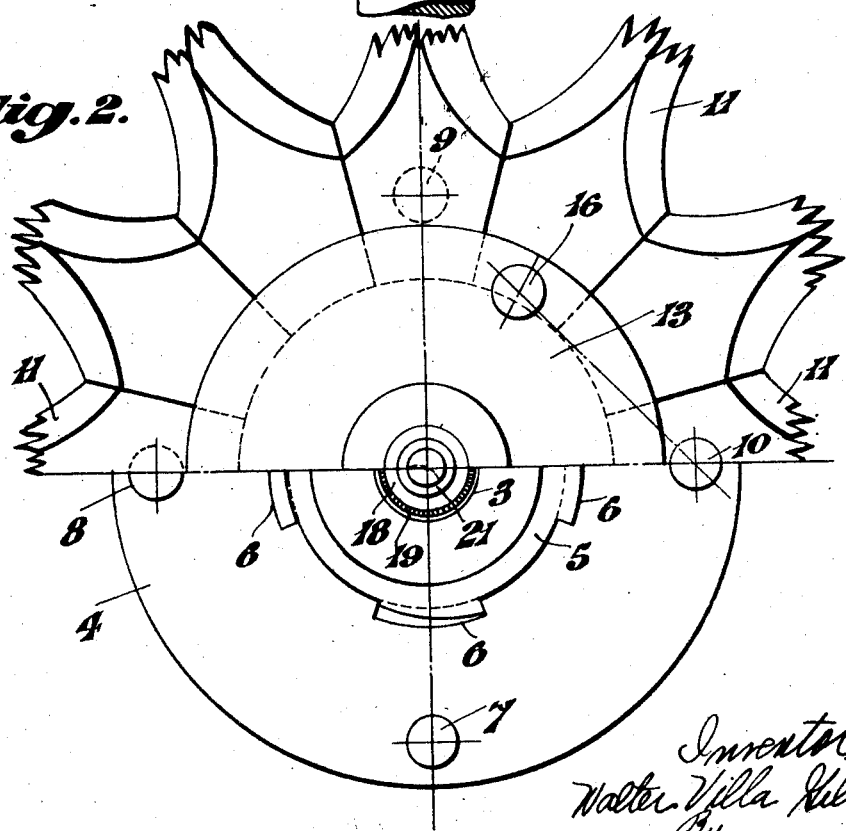

Patented May 3, 1927.

1,627,499

UNITED STATES PATENT OFFICE.

WALTER VILLA GILBERT, OF WESTMINSTER, LONDON, ENGLAND, ASSIGNOR TO GILBERT'S PATENTS LIMITED, OF LONDON, ENGLAND, A COMPANY.

DETACHABLE WHEEL MECHANISM.

Application filed June 7, 1926, Serial No. 114,342, and in Great Britain February 25, 1926.

This invention relates to wheels detachable from shafts or axles.

The invention when applied to detachable wheels of road vehicles has for its object to provide improved means whereby the rapid removal or fixing of the wheel with relation to the wheel axis can be effected with minimum exertion on the part of the user, and the locking of the wheel securely against accidental detachment ensured. The invention is particularly applicable to detachable wheels having permanent and movable hubs screwed together by interrupted threads so as to facilitate quick detachment and attachment of the detachable wheel.

The present invention comprises a detachable wheel or like mechanism for wheels having two members detachably screwed together, such as two hubs one of which is fixed on the wheel axle and the other secured on the detachable wheels, wherein each member is provided with a projection, pin or socket whereby it can be moved around its axis relatively to the other, the two projections, pins or sockets being so situated relatively to each other that they can be moved to or from each other by a suitable implement to effect the relative movement of the two members necessary to tighten them together when attaching the wheel and loosen them when it is required to remove the wheel.

The detachable and permanent members of the detachable wheel mechanism may be held together in the locked position by a locking device which is unlocked by the placing in position on the hubs of an implement for forcing them together into locked position.

In order to prevent vibration or creeping tending to effect disengagement of the permanent and loose hubs after same have been brought to the locked position, a locking device is provided in the form of a detent. The detent is mounted coaxially in the permanent hub in such a manner that it cannot be rotated in relation to the permanent hub but may move in an axial direction against the action of a spring. The spring is for the purpose of keeping the detent forced outwardly to the required extent. The outer end of the detent is conical in shape, the conical surface having serrations or small teeth (after the manner of a gear wheel) preferably cut longitudinally i. e. so that the teeth if produced would all meet at the apex of the cone. This serrated conical surface fits into a corresponding serrated conical hole in the loose hub. Thus when the detent is kept in engagement with the loose hub, the loose hub cannot be rotated (unless accidentally the detent rotates with it), in other words the loose hub cannot rotate relative to the permanent hub. The cones are so designed that the spring above referred to keeps the detent in engagement with the loose hub when the wheel is in position, unless and until an axial pressure is exerted inwardly upon the detent by means of a lever gear or otherwise. So long, however, that the normals between the surfaces of contact between the serrations on the detent and the serrations in the conical hole do not make an angle with the axis of the detent less than the complement of the angle of friction for the surfaces in contact, no rotational force on the loose hub, however great, will cause the detent to move in an axial direction. So long as the angle of the cone is kept within the limit indicated it is as effective in resisting rotation of the loose hub as though the serrated surfaces were parallel. The use of a conical surface has the advantages: (a) that only a small axial movement is required to cause disengagement of the serrations, (b) that wear of the serrated surfaces is automatically taken up by the axial movement of the detent under the action of the spring, (c) an easy engagement of the serrated surfaces is ensured.

A further object of the invention is to effect improvements in the construction of a wheel hub whereby the inner ends of the wheel spokes are tightly compressed between the members of the hub so that wobbling of the wheel incident to loose fitting of the inner ends of the spokes is entirely prevented and a permanent provision against any wobbling of the wheel about its central axis is secured.

The invention will now be described with reference to the accompanying drawings, in which:—

Fig. 1 is a sectional view of the hub portion of a wheel and axle made in accordance with the present invention.

Fig. 2 an elevation of Fig. 1, the upper portion being an outside view while the lower portion illustrates the permanent hub with the wheel removed.

In these drawings 2 is the permanent hub, 3 the axle. The permanent hub 2 is provided with a flange 4, and also with a boss 5 which is threaded on its outside with interrupted screw threads 6 and which is provided with a central recess. Projecting from the flange 4 at uniform distances from each other are four pins 7, 8, 9 and 10 which fit in corresponding openings in the nave-end of the spokes 11 of the wheel, each opening being fitted with a metal bush 12. The pin 10 is of greater length than the others and extends a suitable distance beyond the face of the wheel for engagement with the wheel operating implement.

A loose hub or nut 13 having an outer diameter to fit in a flanged bush 14 secured in the nave ends of the spokes is provided with a flange 15 adapted to bear against the outer surface of the flange of the bush 14, such hub or nut 13 being also provided at its inner end with a retaining flange or ring 26 detachably secured thereon by screws 27. Said loose hub or nut is provided with interrupted screw threads 13ª, to engage and disengage the interrupted threads 6 of the member 5.

On the flange 15 of the loose hub or nut 13 is fixed a pin 16 extending from the face of the wheel to the same extent as the pin 10.

On the inside of the loose hub or nut 13 is formed a boss 17 which extends freely in to the recess in the permanent hub 2 and is bored to receive the end of the axle 3. The end of the axle 3 is also provided with a bore 25 to receive an axially slidable sleeve or detent 18 which is provided with a flanged portion 19 conical on its outer surface and roughened or longitudinally toothed to engage a correspondingly prepared conical opening in the loose hub or nut 13, in which it is held by a spring 20 which bears at one end on the inner edge of the sleeve or detent 18 and at the other end on the inner end of the said bore 25. The sleeve or detent 18 slides axially on a pin 21 which may be fixed at its inner end in the axle 3 and is provided with trunnion arms 22 which extend into longitudinal slots 24 provided in the sleeve or detent 18. The arms 22 prevent rotation of the sleeve or detent 18 relatively to the axle 3.

The interrupted screw threads of the permanent or fixed hub 2 and the removable hub or nut 13 are of coarse pitch similar to that used in a breech block of a gun, thereby enabling the detachable wheel to be quickly removed and replaced, and when replaced to be brought to the same relative position as formerly.

In this example when the pins 16 and 10 are pulled towards each other the threads 13ª of the loose hub or nut 13 are tightened on the threads 7 of the permanent hub 2, and loosened when the pins 16 and 10 are pushed away from each other. When the threads are loosened the hub members 2, 13 can be turned relatively to each other to enable the threads of one member to be in registry with the interruptions of the other so that the wheel and loose hub or nut 13 can be drawn axially off the permanent hub 2 as will be understood.

It will be noted that by reason of the construction of the hub members and the provision of the interrupted screw threads by which said members are connected together, the inner ends of the spokes are tightly compressed between said hub members when the latter are adjusted and the spokes are kept in alignment with the pins 8, 10 so that no wobbling of the wheel is possible incident to any loose fitting of the inner ends of the spokes, and there is a permanent provision against any wobbling of the wheel about its central axis.

In order to provide means for drawing two pins together such as 10 and 16 or equivalent members with great force, an implement is in practice required such as I have described and claimed in my copending divisional application for Letters Patent of the United States, Serial No. 162,901.

What I claim and desire to secure by Letters Patent is:—

1. A detachable wheel having two members detachably secured together and each provided with a projection whereby it can be moved around its axis relatively to the other, the two projections being so situated relatively to one another that they can be moved to or from each other by a suitable implement to effect the relative movement of the two members necessary to secure them together or to disconnect them.

2. Detachable wheel mechanism in accordance with claim 1, including an element for detachably locking said members together, said element having a conical roughened portion to engage a correspondingly roughened conical opening in one of said members and a spring to normally hold said locking element in locking position.

3. In a wheel, a pair of concentrically related hub members arranged for relative rotary movement, said hub members being provided with coacting means to secure said members together when said members are in one relative position and to release and permit the detachment of one of said members from the other member when said members are in another relative position.

4. In combination, an axle, a hub comprising a pair of concentrically arranged members one of which is mounted on said axle, and the other being detachable from the first named member and arranged for relative rotary movement with respect thereto, said members being provided with coacting means to secure said members together when in one relative position and to disconnect said members and permit the detachment of the second named member when said members are in another relative position, and a locking member to prevent casual relatively rotary movement of said hub members, said locking member being mounted on said axle and movable into and out of engagement with said detachable hub member.

5. In combination, an axle, a hub comprising a pair of concentrically arranged members one of which is mounted on said axle, and the other being detachable from the first named member and arranged for relative rotary movement with respect thereto, said members being provided with coacting means to secure said members together when in one relative position and to disconnect said members and permit the detachment of the second named member when said members are in another relative position, and a locking member to prevent casual relative rotary movement of said hub members, said locking member being mounted on said axle and movable into and out of engagement with said detachable hub member, and provided with a conical roughened portion, said detachable hub member having a correspondingly roughened conical opening for engagement by said conical portion.

6. In combination, an axle, a hub comprising a pair of concentrically arranged members one of which is mounted on said axle, and the other being detachable from the first named member and arranged for relative rotary movement with respect thereto, said members being provided with coacting means to secure said members together when in one relative position and to disconnect said members and permit the detachment of the second named member when said members are in another relative position, and a locking member to prevent casual relative rotary movement of said hub members, said locking member being mounted on said axle and movable into and out of engagement with said detachable hub member and a spring to normally hold said locking member in locking position.

7. Detachable wheel mechanism in accordance with claim 1, wherein the two relatively rotatable members are forced together in the locked position and locked by a locking device which is unlocked by the placing in position on the members of an implement for forcing them into locked position.

8. In a wheel, a pair of concentrically related hub members arranged for relative rotary movement and provided with coengaging interrupted screw threads for securing said members together when said members are in one relative position and to release and permit the detachment of one of said members from the other member when said members are in another relative position, spokes having their inner ends arranged between said hub members and pins extending from one of said hub members into the inner end portions, transversely, of said spokes, so that said inner ends of the spokes are kept in alignment with said pins and are tightly compressed between said hub members when the latter are in locked position and loosening of the inner ends of the spokes and wobbling of the wheel about its central axis is prevented.

9. In a wheel, a pair of concentrically related hub members arranged for relative rotary movement, said hub members being provided with coacting means to secure said members together when said members are in one relative position and to release and permit the detachment of one of said members from the other member when said members are in another relative position, and means to lock said members to prevent casual relative rotary movement thereof.

In testimony whereof I hereunto affix my signature.

WALTER VILLA GILBERT.